Figure 1:
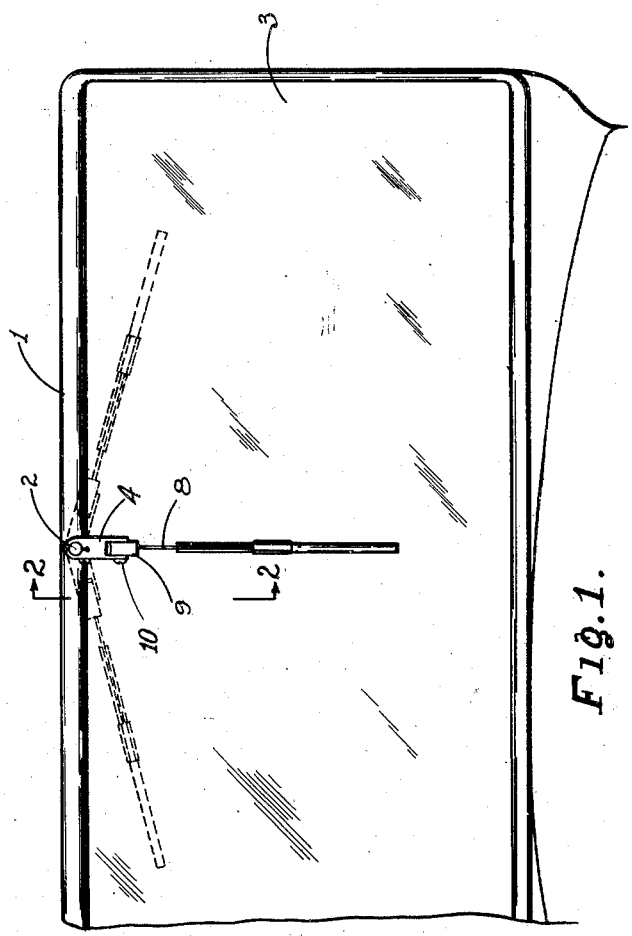

June 25, 1929.  C. H. QUACKENBUSH  1,718,760
WINDSHIELD CLEANER
Filed Oct. 23, 1926

INVENTOR
Cleveland H. Quackenbush
ATTORNEY

Patented June 25, 1929.

1,718,760

UNITED STATES PATENT OFFICE.

CLEVELAND H. QUACKENBUSH, OF SOUTH EUCLID, OHIO.

WINDSHIELD CLEANER.

Application filed October 23, 1926. Serial No. 143,750.

This invention relates to improvements in automobile wind-shield cleaners.

The automatic and hand-operated windshield cleaners now on the market are all provided with a wiper element which is mounted upon the operating shaft and which is arranged so as to engage the outside of the wind-shield to clean the same by its wiping action. The operating shaft extends through the frame just above the windshield and is either driven by an automatic device or is manipulated by a hand lever. The wiper elements of the various windshield cleaners are mounted upon the operating shaft in different manners, but in all cases it is necessary that the wiper maintain a certain angular position with respect to its operating shaft so as to always cover substantially the same extent of surface area on both sides of the vertical plane through the operating shaft. That is, the area covered by the wiper, when operating in a normal manner, is symmetrical with respect to the operating shaft above referred to. It is necessary also that the wiper maintain proper engagement with the surface of the windshield in order to clean the same.

Now, it is common practice of the average laborer who washes automobiles, to turn the wiper upwardly so as to be out of the way while washing the out-side of the windshield. Such turning or twisting of the wiper results, in some cases, in this element being displaced about its operating shaft, and hence the proper angular relation of the wiper to the shaft, as above referred to, is destroyed. It then becomes necessary to restore the proper adjustment. Such turning or twisting of the wiper element, which is of comparatively frail construction, moreover very often means a distortion of the same so as to require frequent straightening or re-adjustment, all of which means an undue tax upon its durability. Furthermore, any attempt to clean the cleaning edge of the wiper will tend to disturb its normal engagement with the wind-shield, as will also the attempt of the careless laborer to turn the wiper up beyond the wind-shield and over the frame of the same so as to get it out of the way, as above explained.

It is, therefore, the object of the present invention to provide a means whereby full and free access may be had to the windshield to wash the same, without any interference by the wiper and without destroying the proper angular relation of the wiper to its operating shaft and furthermore without causing any distortion or other injury to the wiper.

A further object of this invention is to provide such a means whereby the wiping edge of the wiper element may be conveniently cleaned without destroying its proper normal installation with respect to the surface of the wind-shield.

Figure 2:
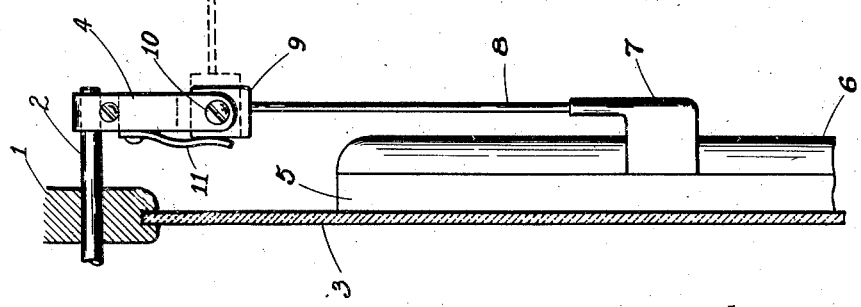

Referring to the accompanying drawing, Fig. 1 is a front elevation of my improved device installed upon an automobile; and Fig. 2 is a detail view taken on line 2—2 of Fig. 1.

The operating shaft which extends through the frame 1 is indicated by reference numeral 2, and is operated either by a hand lever or by an automatic motive means, as are well known in the trade. The glass of the wind-shield is indicated by reference numeral 3. Upon the shaft 2, there is secured a mounting 4 to which the wiper element is, according to the prior structures, directly connected. The wiper element may be considered as comprising the cleaning strip 5 of rubber, the holder 6 therefor, the clamp 7, and the light gauge rod or wire 8 which is, in the prior devices, connected to the mounting 4 or directly to the shaft 2. The particular form of connection here shown between the mounting 4 and shaft 2, may be recognized as part of a well-known windshield cleaner now on the market.

In the present case, I have provided a pivotal connection between the mounting 4 and the holder 9 in which the wire 8 is secured. As clearly indicated in the drawing, the lower end of the mounting or connector element 4 is formed as a clevis into which the upper end of holder 9 fits, with a pivotal connection therebetween as indicated by reference numeral 10. The holder 9 has its inner and top sides squared, as shown in Fig. 2, so as to be engaged by the leaf spring 11 which is mounted upon the inner face of the mounting or connector element 4. The spring 11 engaging the inner squared side of the holder 9, as shown in full lines in Fig. 2, serves to hold the cleaning strip 5 in proper contactual engagement with the glass 3. As here shown, the spring engages the inner side of the holder at a point somewhat above a horizontal line through the pivotal axis 10 so as to ensure such engagement of strip 5, as just referred to. The mounting or connector element 4 is so set on the shaft 2 that when the rod 8 occupies full line position, as indicated in Fig. 2, the rod extends substantially parallel with the glass 3, the mounting or connector element 4 having been so set upon the shaft 2 that the cleaning strip 5 will engage the glass with the proper degree of force.

Then, when it is desired to wash the glass 3, the holder with the wire 8 and the other parts carried thereby can be turned on axis 10 so as to assume dotted line position at 90° to full line position. With the wiping element occupying substantially hoizontal position, it does not interfere with the washing of the glass 3 and at the same time there is afforded an opportunity to clean the wiping edge of the rubber strip 5. Although spring 11 engages the upper part of holder 9, yet, the wiping element will be substantially horizontal when turned to dotted line position. At any rate, the wiper element will, in one position, bear with effective pressure upon the glass and in the other position, will extend at a substantial angle to the glass so as to be out of the way. After washing the glass 3, the wiper element may be turned back through 90° so as to occupy its original position in contact with the glass, as shown in full lines.

My improved wiper element, together with the mounting or connector element 4, may be sold to the individual automobile owner and installed as part of any of the prior forms of wind-shield cleaners, the mounting or connector element 4 being constructed in various forms at its upper end so as to be adapted for attachment to any of the operating shafts of the various types of wind-shield cleaners.

The advantages resulting from my improved form of wind-shield cleaner, as above set forth, will be obvious to any one who is familiar with the art. In addition to those already referred to, it is especially useful in the more arid sections of country where the wind-shield cleaner is idle for the greater part of the time. With my device, it is possible to keep the rubber strip away from the glass during the prolonged periods of idleness and in this way prevent the curling of the edge of the strip which would otherwise result from its continued pressure against the glass.

What I claim as new is:

1. In a windshield cleaner, a connector element, adapted for connection to an operating means, and a cleaning element pivotally mounted upon said connector element, the axis of the pivotal connection therebetween being substantially parallel with the plane of the windshield when installed therewith, thereby permitting the cleaning element to be swung away from the windshield so as to afford full and free access thereto for washing the same, one of said elements having an engageable face and the other of said elements having a leaf spring extending substantially parallel therewith and adapted to engage said face so as to normally maintain the said elements in substantial alignment with each other for operative engagement of the cleaning element with the windshield.

2. In a windshield cleaner, a connector element, adapted for connection to an operating means, and a cleaning element pivotally mounted upon said connector element, the axis of the pivotal connection therebetween being substantially parallel with the plane of the windshield when installed therewith, thereby permitting the cleaning element to be swung away from the windshield so as to afford full and free access thereto for washing the same, one of said elements having squared portions forming an angular body about the axis of pivotal connection between said elements, and the other of said elements having a leaf spring extending substantially parallel with the windshield and adapted to engage one of said squared portions so as to maintain said elements in substantial alignment with each other for operative engagement of the cleaning element with the windshield, and said spring being adapted to engage another of said squared portions so as to temporarily maintain said elements at a substantial angle with respect to each other.

3. In a windshield cleaner, a connector element, adapted to be connected to an operating means, and a cleaning element pivotally mounted upon said connector element, the axis of the pivotal connection thereof being substantially parallel with the plane of the windshield when installed therewith, thereby permitting the cleaning element to be swung away from the windshield, one of said elements having a plurality of engageable portions spaced about the axis of pivotal connection, and said other element having spring means for engagement with said engageable portions, said parts being so constructed and arranged that said spring means will effectively engage one of said engageable portions so as to hold said pivotally connected elements in substantial alignment with each other for operative engagement of the cleaning element with the windshield, and said spring means will effectively engage another of said engageable portions when the cleaning element occupies angular relation to said other element so as to permit full and free access to the windshield for washing the same.

4. In a windshield cleaner, the combination of a wiper element, operating means therefor, a pivotal connection between said wiper element and operating means whereby the wiper element may be temporarily moved away from the windshield without disturbing the normal operative connection of the wiper element, said operating means being substantially outside the area of the windshield, so as to permit full and free access to the windshield for washing the same when the wiper element is in temporary position, and means associated with said pivotal connection for maintaining the wiper element in its operative and temporary positions.

5. In a windshield cleaner, the combination of a wiper element, operating means therefor, a pivotal connection between said wiper element and operating means whereby the wiper element may be temporarily moved away from the windshield without disturbing the normal operative connection of the wiper element, said operating means being substantaially outside the area of the windshield, so as to permit full and free access to the windshield for washing the same when the wiper element is in temporary position, and spring means associated with said pivotal connection for maintaining the wiper element in its operative and temporary positions.

In testimony whereof I affix my signature.

CLEVELAND H. QUACKENBUSH.